Jan. 10, 1928.
E. D. FROST
1,655,994
PIN
Filed Sept. 11, 1926
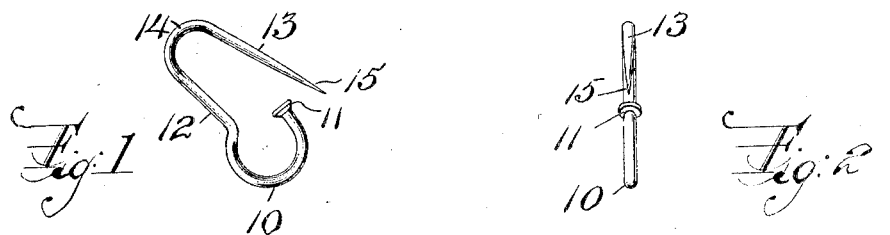
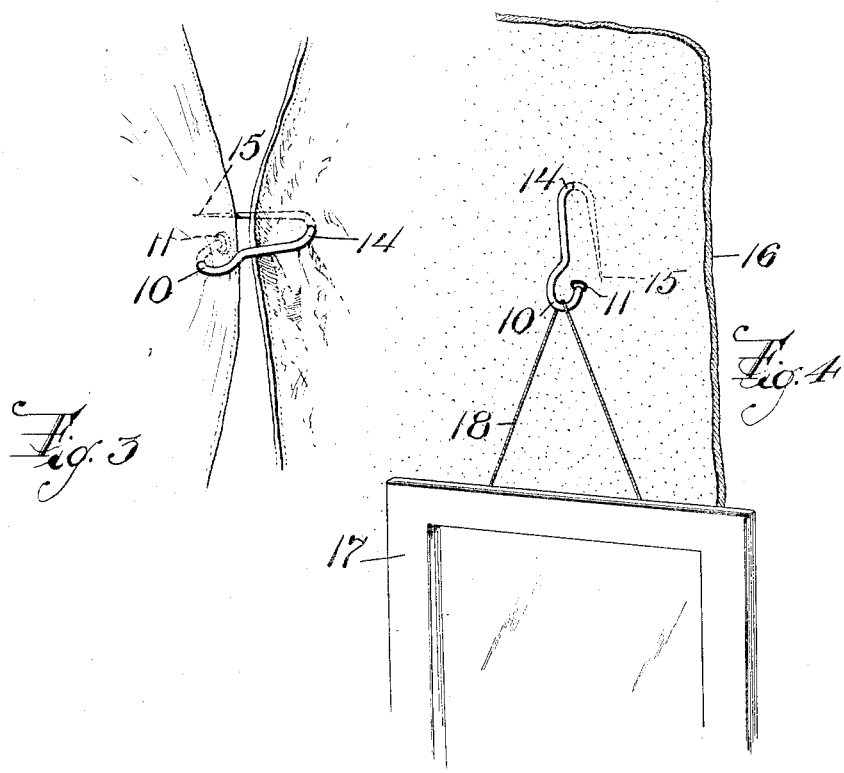
INVENTOR.
Edward D. Frost,
BY
ATTORNEY Patented Jan. 10, 1928.

UNITED STATES PATENT OFFICE.

EDWARD D. FROST, OF ELIZABETH, NEW JERSEY.

PIN.

Application filed September 11, 1926. Serial No. 134,773.

This invention relates to an improved pin which is adapted for use under various circumstances and in numerous situations. For instance, is can be used in lieu of a button as an emergency fastening. It can be used for suspending articles on the walls of a tent when camping and it can be used in many other situations where it will be found applicable.

The invention is a pin of the usual variety with a head on one end and a point on the other end and it is bent so that it can be fastened to one element to be joined to another so that it does not easily become disengaged, the pin being formed at one end into a loop with an open side at the head of the end of the pin being bent into a hair-pin shape for the balance of its length.

The invention is illustrated in the accompanying drawings in which Figure 1 is a side view of my improved pin and Figure 2 is an edge view thereof. Figure 3 is a perspective view showing how the pin can be used in lieu of a button and Figure 4 is a detailed perspective showing the pin used as a suspending means.

The pin is of the usual type being made of wire and it is bent at one end to form a loop 10 at the head end, this loop forming a hook and the head 11 and the end of the hook serving to limit the entrance of the pin into a fabric. Beyond the hook 10 the pin is formed into a hair-pin shaped hook illustrated by the strands 12 and 13 joined by the part 14, this being the point end of the pin, the point 15 being slightly beyond the head 11 as these parts are aligned in substantially the same plane as will be seen from Figure 2. The device is used as in Figure 3 for instance. Under repeated use only the hair-pin-like hook portion needs to be disengaged when the garment is open and the pin hangs suspended by the hook 10 when not in fastening position. In this connection the pin can be used for fastening shawls and coats and similar apparel and can be made of plated ware or precious metal when so used.

The pin can also be used as a suspending means as in Figure 4, the hair-pin hook part being caught in the wall 16 of the tent or the like. Thus presented the hook 10 serves as a supporting hook for various objects used in camping, the illustration showing a frame 17 suspended by the cord 18.

I claim:

A pin bent into a small circular hook and into an elongated hair-pin hook for the rest of its length, the inner arm of the latter hook being radial relative to first hook and the outer arm being at an acute angle to the inner arm whereby the hair-pin hook is widest at its open end and the outer arm is extended beyond the head.

In testimony whereof I affix my signature.

EDWARD D. FROST.